(12) United States Patent
Kim et al.

(10) Patent No.: US 9,420,598 B2
(45) Date of Patent: Aug. 16, 2016

(54) METHOD AND APPARATUS FOR COMBINING SCHEDULES IN WIRELESS COMMUNICATION SYSTEM

(71) Applicant: LG ELECTRONICS INC., Seoul (KR)

(72) Inventors: Seongyun Kim, Anyang-si (KR); Seungkyu Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 111 days.

(21) Appl. No.: 14/397,045

(22) PCT Filed: May 31, 2013

(86) PCT No.: PCT/KR2013/004830
§ 371 (c)(1),
(2) Date: Oct. 24, 2014

(87) PCT Pub. No.: WO2013/180523
PCT Pub. Date: Dec. 5, 2013

(65) Prior Publication Data
US 2015/0110030 A1    Apr. 23, 2015

Related U.S. Application Data (60) Provisional application No. 61/653,411, filed on May 31, 2012.

(51) Int. Cl.
*H04W 4/00* (2009.01)
*H04W 72/12* (2009.01)
*H04W 24/10* (2009.01)

(52) U.S. Cl.
CPC .......... *H04W 72/1205* (2013.01); *H04W 4/005* (2013.01); *H04W 24/10* (2013.01)

(58) Field of Classification Search
CPC .. H04W 72/1205; H04W 4/005; H04W 24/10
See application file for complete search history.

(56) References Cited

U.S. PATENT DOCUMENTS

2012/0254417 A1*  10/2012  Luna ................... H04L 67/2828
                                                                    709/224
2012/0264451 A1    10/2012  Kim et al.
(Continued)

FOREIGN PATENT DOCUMENTS

KR    10-2010-0099625 A    9/2010
KR    10-2011-0081750 A    7/2011
(Continued)

*Primary Examiner* — Jay P Patel
(74) *Attorney, Agent, or Firm* — Birch, Stewart, Kolasch & Birch, LLP (57) ABSTRACT

A method for combining two or more schedules in a machine to machine (M2M) communication system according to one embodiment of the present invention is disclosed. The method is performed by a M2M server and comprises the steps of: receiving at least one schedule request from at least one M2M application—the schedule request requesting a measurement a report for a specific resource for a specific M2M device—; determining whether a first permissible interval of a measurement time point or a report time point included in the schedule request is overlapped with a second permissible interval of a measurement time point or a report time point of the pre-stored M2M schedule when an ID of the M2M device and an ID of the resource included in the schedule request are the same as the ID of the M2M device and the ID of the resource of the pre-stored M2M schedule; and generating mapping information for indicating a relationship between the schedule request and the pre-stored M2M schedule when determining that the first permissible interval and the second permissible interval overlap.

16 Claims, 5 Drawing Sheets

(56) References Cited

U.S. PATENT DOCUMENTS

| | | |
|---|---|---|
| 2012/0311101 A1 | 12/2012 | Chao |
| 2013/0017829 A1 | 1/2013 | Kim et al. |
| 2013/0051228 A1 | 2/2013 | Kim et al. |
| 2013/0227127 A1* | 8/2013 | Takano ............... G06F 9/5044 709/224 |
| 2013/0252610 A1* | 9/2013 | Kim ................... H04W 4/005 455/435.1 |
| 2015/0282208 A1* | 10/2015 | Yi ..................... H04W 72/121 370/329 |

FOREIGN PATENT DOCUMENTS

| | | |
|---|---|---|
| KR | 10-2011-0081751 A | 7/2011 |
| KR | 10-2012-0011012 A | 2/2012 |
| WO | WO 2011/094951 A1 | 8/2011 |

* cited by examiner

METHOD AND APPARATUS FOR COMBINING SCHEDULES IN WIRELESS COMMUNICATION SYSTEM

CROSS REFERENCE TO RELATED APPLICATIONS

This application is the National Phase of PCT International Application No. PCT/KR2013/004830, filed on May 31, 2013, which claims priority under 35 U.S.C. 119(e) to U.S. Provisional Application No. 61/653,411, filed on May 31, 2012, all of which are hereby expressly incorporated by reference into the present application.

TECHNICAL FIELD

The present invention relates to a wireless communication system, and more particularly to a method and apparatus for combining schedules in a wireless communication system.

BACKGROUND ART

M2M (Machine to Machine) communication technology has come into the spotlight with the advent of ubiquitous era. M2M communication technologies have been intensively researched in many Standard Development Organizations (SDOs) such as TIA, ATIS, ETSI, etc. Communication between an M2M server part and an M2M client or M2M device (hereinafter referred to as M2M device) is of important to the M2M technologies. Generally, since communication between a small number of M2M servers and a large number of M2M devices occurs, communication overload may occur in the network between two entities. Since communication overload occurs and M2M devices are mainly used as battery-based communication devices, technologies for allowing the M2M devices to stay in a power-saving mode or a sleep mode for a longer time so as to increase a battery lifetime as well as to reduce power consumption are of important to M2M communication environments.

Communication frequently generated between the M2M server and the M2M server may periodically read values of sensors contained in the M2M device and then report the read values to the M2M server. In this case, it should be noted that all M2M applications do not require the measurement or report time as time critical information. Although a little time error occurs in a certain M2M application, the time error may not cause no problem to the M2M application, or may cause serious problems to the M2M application.

As a result, there is a need to develop a technology for reducing the amount of power consumed for the M2M device by optimizing a periodic report of the same resources in consideration of a parameter such as a time error, and at the same time reducing the amount of communication information between the M2M device and the M2M server.

DISCLOSURE

Technical Problem

An object of the present invention is to provide a method for optimizing schedules of the M2M device.

Another object of the present invention is to provide a method for reducing the amount of power consumed for the M2M device and reducing the amount of communication information between the M2M device and the M2M server.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for combining two or more schedules in a machine to machine (M2M) communication system by an M2M server including: receiving at least one schedule request from at least one M2M application, wherein the schedule request is configured to request measurement or report of a specific resource for a specific M2M device; if an M2M device identifier (ID) and resource ID contained in the schedule request are identical to those of a prestored M2M schedule, determining whether a first allowable interval for measurement or report contained in the schedule request overlaps with a second allowable interval for measurement or report of the prestored M2M schedule; and if it is determined that the first allowable interval overlaps with the second allowable interval, generating mapping information indicating the relationship between the schedule request and the prestored M2M schedule.

Preferably, the method may further include: receiving a report for measurement from the M2M device in a overlap interval in which the first allowable interval overlaps with the second allowable interval.

Preferably, the method may further include: when receiving a report of first measurement of the prestored M2M schedule at a specific time of the overlap interval, a report for measurement of the schedule request at the specific time is replaced with the received report for the first measurement.

Preferably, the mapping information may include an ID of the schedule request, an ID of the prestored M2M schedule, and condition for a report to the M2M application.

Preferably, the schedule request may include at least one of a schedule ID, an M2M application ID, an M2M device ID, a resource ID, period of the measurement or report-related information, and allowable interval—for the measurement or report-related information.

Preferably, if the schedule ID is not contained in the schedule request, a schedule ID may be allocated to the schedule request.

Preferably, the method may further include: if the first allowable interval does not overlap with the second allowable interval, generating and storing an M2M schedule corresponding to the schedule request.

Preferably, the method may further include: storing mapping information indicating the relationship between the generated M2M schedule and the schedule request.

Preferably, the generated M2M schedule may be transmitted to an M2M device indicated by a requested M2M device ID contained in the schedule request.

In accordance with another aspect of the present invention, a method for combining two or more schedules in a machine to machine (M2M) communication system by an M2M device includes: receiving, from at least one M2M server at least two schedule requests transmitted from at least one M2M application, wherein each of the at least two schedule requests is configured to request measurement or report of a specific resource for a specific M2M device; if an M2M device identifier (ID) and resource ID contained in a first schedule request are identical to those of a second schedule request, detecting an overlap interval in which a first allowable interval for measurement or report contained in the first schedule request overlaps with a second allowable interval for measurement or report contained in the second schedule request; and generating information regarding the overlap interval, and schedule data including a schedule ID contained in the first schedule request and a schedule ID contained in the second schedule request.

Preferably, the method may further include: performing the measurement or report in the overlap interval according to the generated schedule data.

Preferably, the method may further include: when receiving the first schedule request and the second schedule request from the same M2M server, transmitting a report for the generated schedule data to the M2M server via a single message.

Preferably, the method may further include: if a first measurement or first report related to the first schedule request is performed at a specific time of the overlap interval, a measurement or report of the second schedule request at the specific time is replaced with the first measurement or first report.

Preferably, the schedule request may include at least one of a schedule ID, an M2M application ID, an M2M device ID, a resource ID, period of the measurement or report-related information, and allowable interval for the measurement or report-related information.

Preferably, if the schedule ID is not contained in the schedule request, a schedule ID may be allocated to the schedule request.

Preferably, the method may further include: if the first allowable interval does not overlap with the second allowable interval, performing the measurement or report according to first schedule data and second schedule data respectively corresponding to the first schedule request and the second schedule request.

It is to be understood that both the foregoing general description and the following detailed description of the present invention are exemplary and explanatory and are intended to provide further explanation of the invention as claimed.

Advantageous Effects

As is apparent from the above description, the embodiments of the present invention can efficiently perform measurement or report of the M2M device.

The embodiments of the present invention can reduce a wake-up time of the M2M device so as to efficiently control the use of power of the M2M device.

The embodiments of the present invention can allow the M2M device to reduce the amount of communication information between the M2M device and the M2M server.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form. The same reference numbers will be used throughout the drawings to refer to the same or like parts.

Figure 1:
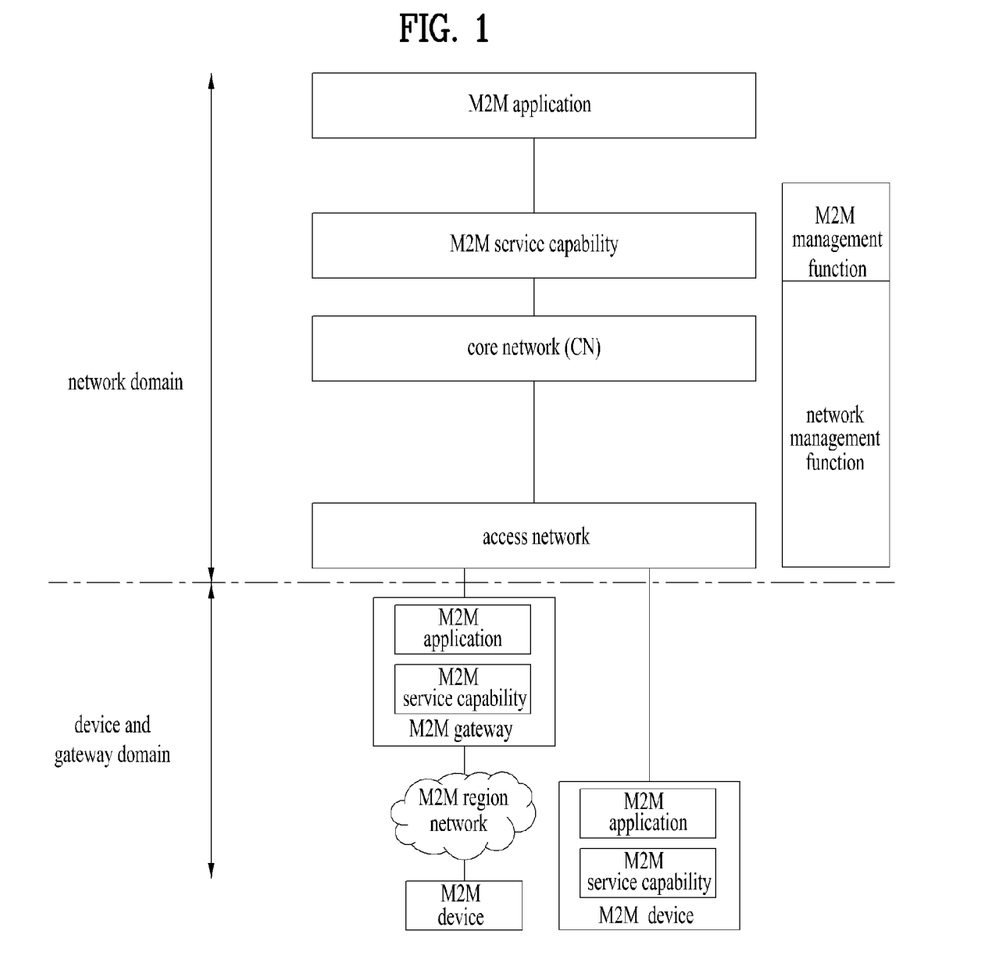
FIG. 1 is a conceptual diagram illustrating a machine-to-machine (M2M) communication system.

In the present invention, a machine-to-machine (M2M) device is fixed or mobile. The M2M device is a device that transmits and receives user data and/or control information by communicating with an M2M server. The term 'M2M device' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. The M2M server is typically a fixed station that communicates with M2M devices and/or other M2M servers. The M2M server exchanges data and control information with M2M devices and/or other M2M servers. FIG. 1 is a conceptual diagram illustrating a machine-to-machine (M2M) communication system.

FIG. 1 is a conceptual diagram illustrating the M2M communication system proposed by ETSI M2M functional architecture standard documents [ETSI Arch]. The M2M communication system proposed by ETSI may be largely classified into a network domain device and a gateway domain. Respective entities will hereinafter be described in detail.

Device and Gateway Domain

M2M device: M2M device is an entity for operating the M2M device application through the M2M service throughput. The M2M device may be directly connected to the network domain, and may also be connected to the network domain through the M2M gateway. If the M2M device is connected to the network domain through the M2M gateway, the M2M gateway may operate with a proxy.

M2M region: M2M device may provide connectivity between the network M2M devices and the M2M gateways. As representative exemplary technologies for implementing the M2M region network, Personal Area Network (PAN) technologies, such as IEEE802.15.1, Zigbee, Bluetooth, IETF ROLL, and ISA100.11a. and local network technologies, such as PLC, M-BUS, wireless M-BUS, and KNX, may be used.

M2M gateway: M2M gateway is an entity for operating the M2M device application through the M2M service throughput. The M2M gateway may serve as a proxy between the network domain and each M2M device, and may provide services to the ETSI M2M non-compliant devices.

Network Domain

Access Network: Access Network (AN) is an entity for enabling the M2M device and the gateway domain to communicate with a core network (CN). Various access networks may be used as exemplary access networks, for example, xDSL, HFC, satellite, GERAN, UTRAN, eUTRAN, W-LAN, WiMAX, etc.

Core Network (CN): CN may provide various functions, for example, IP connectivity, control of services and network, interconnection, roaming, etc., and may include 3GPP CNs, ETSI TISPAN CN, 3GPP2 CN, etc.

M2M service function: The M2M service provides M2M functions capable of being shared by a plurality of M2M network applications, and exposes the M2M functions through an open interface, so that the M2M network applications can use the exposed M2M functions. The M2M service function is an entity capable of optimizing and summarizing application development although the CN function is used and details of the network are unknown. The M2M server is an entity having a Network Service Capabilities Layer indicating the M2M service function of the network part, and may also be referred to as an infrastructure node or the like.

M2M application: The M2M application is an entity capable of operating the service logic and employing the M2M service function through the open interface.

The ETSI M2M communication system structure has many entities. The relationship between entities may be briefly denoted by the relationship among M2M network application and M2M server (M2M network service function), networks (Core Network (CN), access network (AN)), and M2M device. Meanwhile, the M2M gateway may refer to an entity having a gateway function from among M2M devices. The network provides connectivity to respective entities instead of performing the M2M function. Thus, communication among the remaining parts other than the network can be summarized as communication among the M2M network application, the M2M server, and the M2M device.

Figure 2:
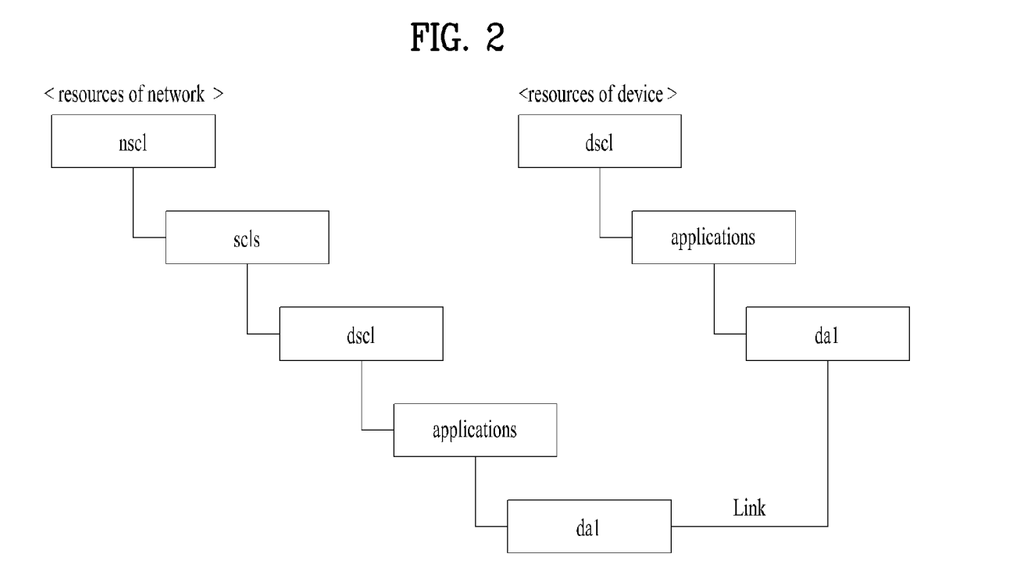
FIG. 2 is a conceptual diagram illustrating a resource structure of an application for use in the M2M communication system.

In ETSI M2M, the M2M device application contained in the M2M device can communicate with the M2M network application connected to the M2M server through application resources. The relationship of connection among the resources is shown in FIG. 2. Device Service Capabilities Layer (DSCL) of the M2M device is present in the M2M device, and Device Application 1 acting as a device application is also present therein. Network Service Capabilities Layer (NSCL) of the M2M server is present in the M2M server. DSCL is located below Service Capabilities Layers (SCLs) that is connected to NSCL or has a known announced entity. DSCL has an application denoted by 'da1', 'da1' of the M2M server is linked to the M2M da1, 'da1' resources of the M2M device are accessible by accessing the M2M server 'da1'.

In the legacy M2M communication system structure, the corresponding M2M network application has access right to the corresponding command upon receiving a communication command from the M2M network application connected to the M2M server to the M2M device application of the M2M device, and the M2M server has performed forwarding to the M2M device. If communication is achieved by the above scheme, M2M network applications do not separately communicate with other network applications, such that it is impossible to recognize whether other M2M network applications have performed the same request, a request for the same resources is repeatedly generated, and communication load between the M2M server and the M2M device is unavoidably increased. In addition, if it is assumed that this request is periodically generated, communication load continuously occurs.

The present invention provides an optimization mechanism for the M2M server and the M2M device upon receiving a report request command frequently performed in the M2M communication environment in consideration of time errors, such that communication load between the M2M device and the M2M server and battery/power consumption of the M2M device can be reduced.

First Embodiment

Optimization Action of M2M Server

The embodiment of the present invention provides a method for allowing the M2M server to optimize measurement or report corresponding to a schedule request for (periodic or aperiodic) measurement or (periodic or aperiodic) report. The M2M network application may fabricate a schedule request for the received periodic measurement or report, and may transmit the fabricated schedule request for periodic measurement or report to the M2M device. Accordingly, the schedule request for periodic measurement or report received from the M2M network application may be different from the other schedule request for periodic measurement or report transmitted to the M2M device. In the present invention, in order to accomplish the optimization operation, the schedule request, the M2M schedule, and the relationship between the schedule request and the M2M schedule may be used, and a detailed description thereof will hereinafter be described in detail.

Figure 3:
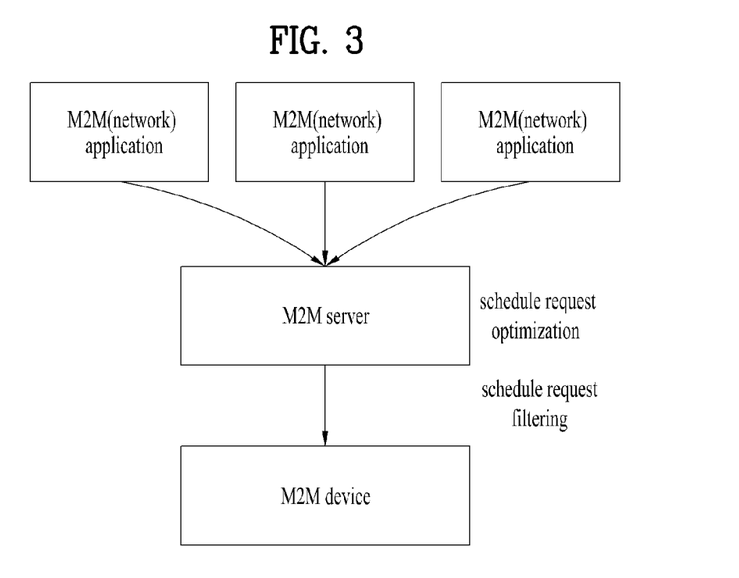
FIG. 3 is a conceptual diagram illustrating schedule optimization according to an embodiment of the present invention.

In accordance with the optimization action of the M2M server, the periodic (or aperiodic) schedule request transferred from the M2M network application to the M2M server is fabricated by the M2M server, such that the optimization or filtering action can be achieved. FIG. 3 is a conceptual diagram illustrating schedule optimization according to an embodiment of the present invention. In the embodiments of the present invention, the term "M2M network application" may also be referred to as "M2M application".

As can be seen from FIG. 3, the schedule request for periodic measurement or report received from the M2M network applications may be optimized by the M2M server, and the M2M server may transmit the optimized result to the M2M device. For example, the optimization result may be referred to as "M2M schedule", and the M2M schedule may correspond to specific information designated by the M2M device in a manner that measurement or report can be performed according to the M2M schedule.

The schedule request may be schedule information for requesting periodic (or aperiodic) measurement or report transferred from the M2M application to the M2M server. The schedule request may be stored in the storage unit (or the like) of the M2M server, and the schedule request may include at least one of the following parameters.

Schedule ID: Identifier (ID) of the schedule request

Application ID: ID of M2M application having transmitted (or requested) the schedule request Device ID: ID of M2M device corresponding to a request target of the schedule request Resource ID: ID of a resource of the measurement or report target requested by the schedule request P: ID of a target resource of periodic measurement or report requested by the schedule request $T_s$: Start time of the periodic measurement or report, and the following cases may be used according to various configurations.

The explicit designation case (for example: 1 PM, 22 May 2013)

Reception time of the schedule request

Time within one period starting from the reception time of the schedule request, and this time may be decided by the M2M server or the M2M application.

$T_E$: $T_E$ is a termination time of the periodic measurement or report, and the following cases may be sued according to various configurations.

The explicit designation case (for example, 5 PM, 22 May 2013)

Case in which the number of reports is explicitly designated (for example, 100 report times)

Case in which the number of reports is not explicitly designated, and this case is continuously performed until receiving a termination command of the schedule request.

Allowable interval for measurement or report (TA; time accuracy): TA is an allowable time error range of the measurement or report time in response to the schedule request. That is, the TA may correspond to a predetermined time range on the basis of each of the measurement and report times defined by P, Ts and TE. The measurement or report value of the resource ID contained in the range of the corresponding TA can be allowed as the measurement or report of the schedule report. The higher the time critical degree of the measurement or report based on the schedule request, the smaller a value of the TA. In addition, the TA of the measurement or report may be configured by the M2M application, or may also be configured by the M2M server.

In this case, the schedule ID may be excluded from the schedule request, and the M2M server may allocate the schedule ID to the schedule request.

Figure 4:
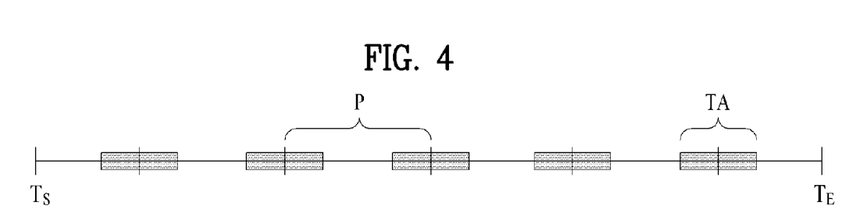
FIG. 4 is a conceptual diagram illustrating data of a schedule according to an embodiment of the present invention.

FIG. 4 shows the values of $T_s$, $T_E$, P, and TA on a time axis. Referring to FIG. 4, it is determined that the measurement or report value within the TA range be appropriate for the schedule request, and the associated examples will hereinafter be described in detail.

The M2M schedule is specific information that is generated or fabricated by the M2M server on the basis of the schedule request, so that the M2M schedule is transmitted to the M2M device. The M2M device may be configured to perform the measurement or report according to the M2M schedule instead of the schedule request. Therefore, contents of the schedule request may be different from contents of the M2M schedule.

The M2M server may generate the M2M schedule on the basis of TA of the schedule request. Accordingly, the TA information may be omitted from the M2M schedule. In addition, the M2M server and the M2M device may store the M2M schedule therein.

The M2M schedule may include M2M schedule element(s) including at least one of the following parameters.

M2M schedule ID: Identifier (ID) of M2M schedule

D: D is a parameter indicating a destination to be measured or reported.

Furthermore, the M2M schedule may include at least one of the parameters contained in the schedule request.

The mapping information may indicate the relationship between the schedule request and the M2M schedule. The mapping information may be stored in the storage unit of the M2M server, and may include at least one of the following parameters.

$ID_{M2M\ schedule}$: ID of the M2M schedule $ID_{schedule\ request}$: ID of the schedule request Condition: Measured or reported data in response to the M2M schedule may indicate conditions to be applied to the M2M application indicated by the application ID contained in the schedule request. As a representative example of the above conditions, an exemplary condition "each data being measured or reported three times from 01:00 31 May 2012 is transmitted to the corresponding application" may be used. Only when the above condition is satisfied, the M2M server may transmit the measured or reported data received from the M2M device to the above applications.

On the other hand, the M2M device may perform the measurement or report according to the M2M schedule, and may transmit the measured or reported result (i.e., the measured or reported data) to the M2M server. The measured or reported data will hereinafter be referred to as M2M report data in the following description, and the M2M report data may include at least one of the following parameters.

ID of M2M schedule: This is an identifier (ID) of the M2M schedule having requested the M2M report data.

The reported or reported data: This is data to be measured or reported in response to the M2M schedule.

Figure 5:
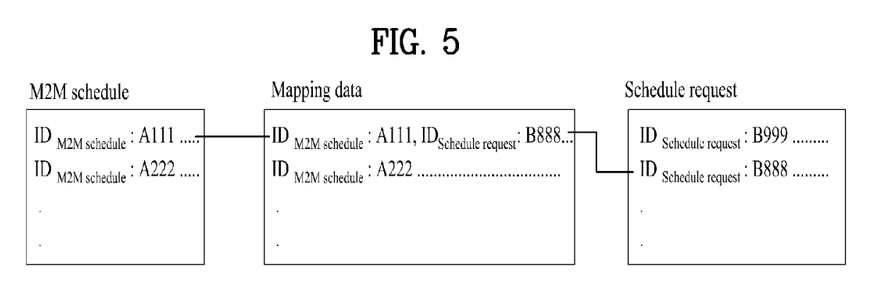
FIG. 5 is a conceptual diagram illustrating data of a schedule according to an embodiment of the present invention.

FIG. 5 is a conceptual diagram illustrating the relationship among the schedule request, the M2M schedule, and wrapping information. Referring to FIG. 5, the M2M schedule having "M2M schedule ID=A111" and the schedule request having "schedule request ID=B888" may be used as one mapping information element of the mapping information. As a result, if the measurement or report having "M2M schedule ID=A111" is transferred from the M2M device to the M2M server, it is determined whether the corresponding measurement or report corresponding to the application having "Schedule Request ID=B888" can be transmitted according to the above condition.

Figure 6:
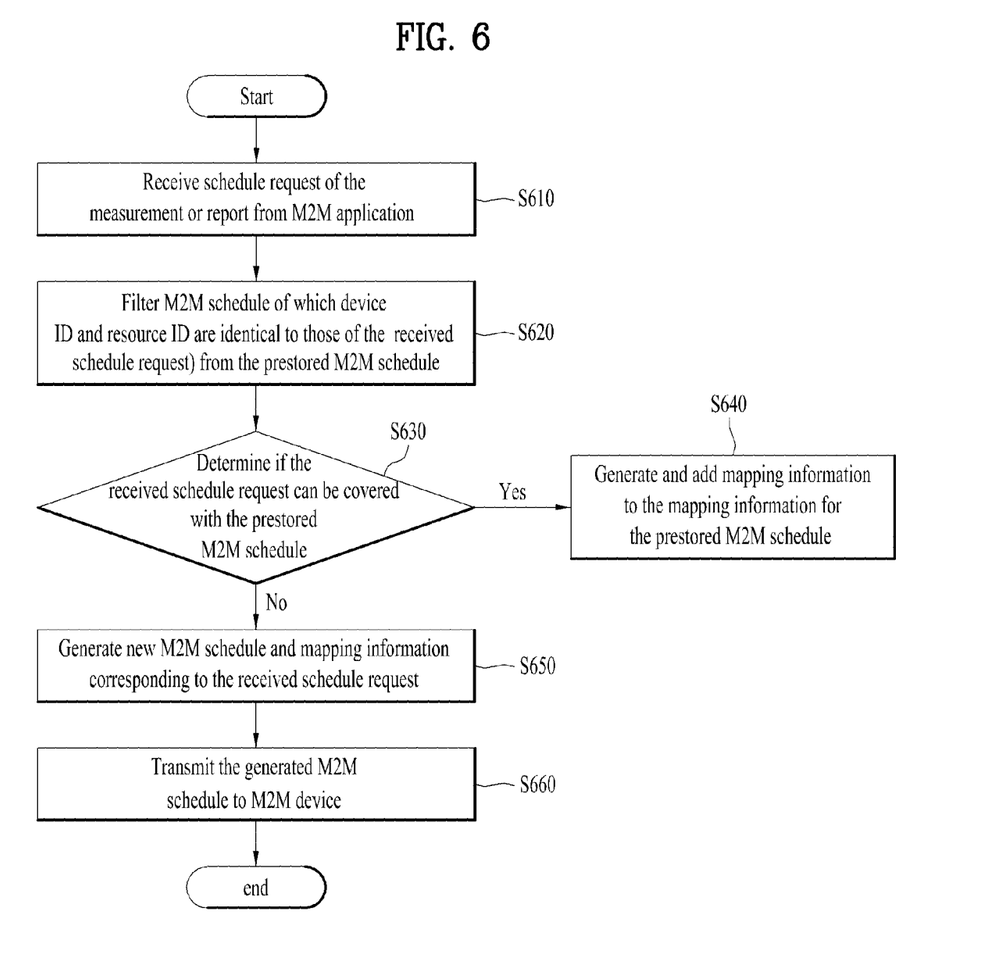
FIG. 6 is a flowchart illustrating a schedule optimization action according to an embodiment of the present invention.

FIG. 6 is a flowchart illustrating a schedule optimization action of the M2M server according to an embodiment of the present invention.

Referring to FIG. 6, the M2M server may receive a schedule request for the periodic (or aperiodic) measurement or report from the M2M application in step S610. Upon receiving the schedule request, the M2M server may register a new schedule request, or may perform modification according to the prestored schedule request and/or the M2M schedule.

The M2M server may filter the M2M schedule elements having the same device ID and resource ID of the received schedule request, from the prestored M2M schedule in step S620. If the M2M schedule element having the same device ID and resource ID is present in the prestored M2M schedule, the measurement or report of the received schedule request may be combined (or integrated) with the measurement or report of the corresponding M2M schedule element of the prestored M2M schedule according to whether TA parts of the measurement or report to be performed after completion of this process overlap with each other, such that two measurement or report times may be reduced to one measurement or report time. Therefore, before confirmation of the presence or absence of TA overlapping, it can be determined whether the device ID is identical to the resource ID.

The M2M server may determine whether the measurement or report of the received schedule request can be covered with the prestored M2M schedule in step S630. As described above, if the prestored M2M schedule includes the M2M schedule element having the same device ID and resource ID of the received schedule request, the M2M server compares TA of the M2M schedule element with TA of the received schedule request, such that the M2M server can determine whether the two TAs overlap with each other. If the two TAs overlap with each other, it is determined whether the received schedule request is covered with the prestored M2M schedule or the corresponding M2M schedule element.

If the measurement or report of the received schedule request is covered with the prestored M2M schedule in step S630, the M2M server may generate the mapping information element, and may add the generated mapping information element to the prestored M2M schedule or the M2M schedule element(s) in step S640. For example, the schedule ID and condition of the received schedule request may be added to the mapping information of the prestored M2M schedule or the M2M schedule element(s).

Thereafter, the M2M server may receive the report from the M2M device in a specific section in which the two TAs overlap with each other.

If the measurement or report of the received schedule request is not covered with the prestored M2M schedule in step S630, the M2M server may generate the new M2M schedule (or M2M schedule element) and mapping information corresponding to the received schedule request in step S650. In addition, the generated M2M schedule (or M2M schedule element) and mapping information may be stored.

The M2M server may transmit the generated M2M schedule to the corresponding M2M device in step S660. Accordingly, the M2M device having received the generated M2M schedule may update the M2M schedule stored in its own storage unit on the basis of the generated M2M schedule.

In addition, the embodiments can be made available to the following cases.

The schedule request may be received from the M2M application just after the measurement or report of the prestored M2M schedule is performed. In this situation, upon receiving the schedule request, the M2M server may perform the above steps S620 and S630, and it can be determined that the received schedule request of the step S630 is covered with the prestored M2M schedule. Thereafter, it is assumed that the step S640 has already been performed.

In this case, the report or measurement in TA of the prestored M2M schedule may be performed in advance for a specific section in which the received schedule request is covered with the prestored M2M schedule (i.e., two TAs overlap with each other). Generally, if the measurement or report time of the received schedule request belongs to a subset of the measurement or report time of the prestored M2M schedule, there is a high possibility that the measurement or report action occurs in some initial sections from among the overlap sections. As the result of the report or measurement, the M2M server may store the measurement or report data therein.

In this case, the M2M server does not receive the measurement or report of the overlap section corresponding to the schedule request from the M2M device. Of course, according to this embodiment, optimization is achieved in the M2M server, and it is impossible for the M2M device to recognize such optimization information. That is, the prestored M2M schedule can be optimized through the wrapping information, the optimization information can be known only to the M2M server, and no information is provided to the M2M device.

Instead, the M2M server may use the measurement or report of the already-performed overlap section in response to the schedule request. That is, the measurement or report corresponding to the schedule request within the overlap section may be replaced with the already-performed measurement or report of the overlap section.

By the optimization action of the M2M server according to an embodiment of the present invention, two or more schedule requests from the same M2M application or different M2M applications may be integrated into one schedule. Accordingly, although the related art must perform the measurement or report action based on at least two schedule requests at least twice, the present invention can replace the legacy operation with another action through only one measurement or report action.

Second Embodiment

Optimization Action of M2M Device

Second embodiment can provide the optimization action of the M2M device. In accordance with the optimization action of the M2M device, the schedule request received from the M2M application is applied to the M2M device indicated by the schedule request, without being modified, changed, or optimized by the M2M server, such that the M2M device can optimize the schedule request. Differently from the first embodiment, the schedule request, and the measurement or report data corresponding to this schedule request can be used in the second embodiment.

Figure 7:
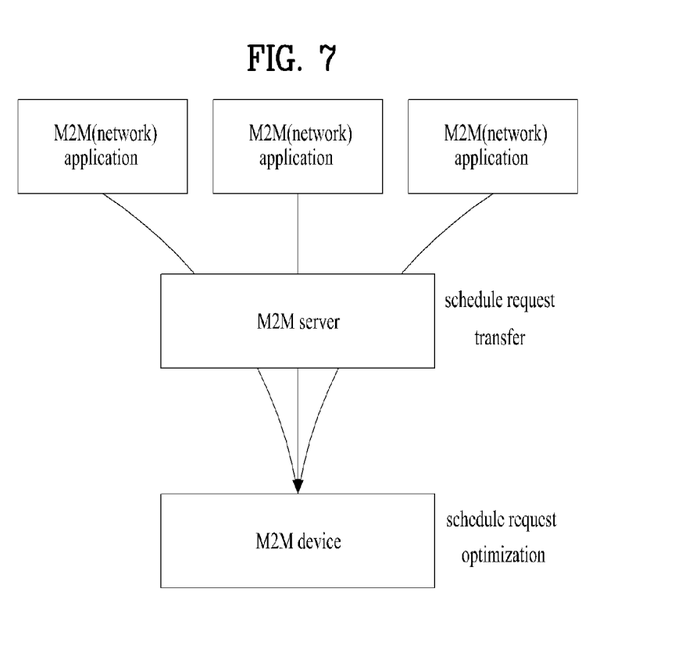
FIG. 7 is a conceptual diagram illustrating data of a schedule according to an embodiment of the present invention.

FIG. 7 is a conceptual diagram illustrating the optimization action of the M2M device. The schedule request received from the M2M applications is not processed by the M2M server. The M2M server transmits the schedule request to the M2M device, and the M2M device may optimize the schedule request. In case of the optimization action of the M2M server according to the first embodiment, schedule requests of the M2M applications connected to one M2M server can be optimized. The optimization action of the M2M device according to the second embodiment can optimize the schedule request of the M2M applications connected to a plurality of M2M servers, and the optimization action of the second embodiment may be more useful in multiple M2M server environments as compared to the first embodiment.

As described above, the optimization method of the schedule request of the M2M device does not fabricate the schedule request received from the M2M application and transmits the unchanged schedule request to the M2M device, so that an additional schedule of the M2M server is no longer required and thus the wrapping data is also no longer required. However, optimization is achieved in the M2M device, so that schedule data to be generated as the optimization result of the M2M device may be required, and as such a detailed description thereof will be given below.

The schedule request according to this embodiment may correspond to a schedule of the measurement or report requested from the M2M application to the M2M server. The M2M server and the M2M device may store the schedule request therein.

The schedule request may include at least one of the following parameters.

Schedule ID: Identifier (ID) of the schedule request

Application ID: ID of M2M application having transmitted (or requested) the schedule request Device ID: ID of M2M device corresponding to a request target of the schedule request Resource ID: ID of a resource of the measurement or report target requested by the schedule request P: ID of a target resource of periodic measurement or report requested by the schedule request $T_s$: Start time of the periodic measurement or report, and the following cases may be used according to various configurations.

The explicit designation case (for example: 1 PM, 22 May 2013)

Reception time of the schedule request

Time within one period starting from the reception time of the schedule request, and this time may be decided by the M2M server.

$T_E$: $T_E$ is a termination time of the periodic measurement or report, and the following cases may be sued according to various configurations.

The explicit designation case (for example, 5 PM, 22 May 2013)

Case in which the number of reports is explicitly designated (for example, 100 report times)

Case in which the number of reports is not explicitly designated, and this case is continuously performed until receiving a termination command of the schedule request.

Time allowed (TA) for the measurement or report: TA is a time error allowance range of the measurement or report time in response to the schedule request. That is, the TA may correspond to a predetermined time range on the basis of each of the measurement and report times defined by P, Ts and TE. The measurement or report value of the resource ID contained in the range of the corresponding TA can be allowed as the measurement or report of the schedule report. The higher the time critical degree of the measurement or report based on the schedule request, the lower the TA value.

In this case, the schedule ID may be excluded from the schedule request, and the M2M server may allocate the schedule ID to the schedule request.

The optimization action of the M2M device will hereinafter be described in detail.

The M2M device may receive at least two schedule requests received from at least two M2M applications from one or more M2M servers. The M2M device may determine whether device IDs and resource IDs of the two or more schedule requests are identical to each other. In this case, the device ID may be excluded from the schedule request. In addition, assuming that the M2M device indicated by the schedule requests indicates the M2M device (i.e., if the M2M server correctly transmits the schedule requests to the M2M device), it is not necessary to determine the presence or absence of device ID identity.

If two or more schedule requests have the same device ID and resource ID, the M2M device may detect the overlap section between the first TA {indicating TA of the measurement or report of one schedule request (hereinafter referred to as 'first schedule request')} and the second TA {indicating TA of the measurement or report of the remaining schedule requests (hereinafter referred to as 'second schedule request') }. In this embodiment, detecting the overlap section between the first TA and the second TA indicates that the first TA may partially overlap with the second TA. For example, if the first schedule request and the second schedule request are the schedule requests of the periodic measurement or report, the first TA of the first schedule request may completely overlap with the second TA of the second schedule request, or may completely deviate from each other. The first TA of the first schedule request may partially overlap with the second TA of the second schedule request. As a result, this embodiment can also perform the optimization action in the above case in which the first TA partially overlaps with the second TA.

If the overlap section between the first TA and the second TA is detected, the M2M device may generate not only information regarding the overlap section but also schedule data including schedule IDs of the first schedule request and the second schedule request. The schedule data may perform the measurement or report corresponding to the first schedule request and the measurement or report corresponding to the second schedule request in the overlap section. Since the first schedule request and the second schedule request indicate the measurement or report of the same resources, so that this means that only one measurement or report action is needed.

The M2M device may perform the measurement or report action in the overlap section according to the generated schedule data.

Meanwhile, if the first TA does not overlap with the second TA, the measurement or report action corresponding to the first schedule data generated from the first schedule request and the measurement or report action corresponding to the second schedule data generated from the second schedule request can be performed. In this case, the first schedule data may include a schedule ID of the first schedule request, and the second schedule data may include a schedule ID of the second schedule request.

In addition, if the first schedule request and the second schedule request are received from the same M2M server, the M2M device may transmit the report corresponding to the generated schedule data to the M2M server using one message.

In addition, the following embodiment may be useful to the following cases.

The M2M device may receive the first schedule request and the second schedule request from the M2M server at different times. In other words, the first schedule request may be received earlier than the second schedule request, such that the measurement or report based on the first schedule request may be performed before reception of the second schedule request. In this situation, upon receiving the second schedule request, the M2M device compares a specific parameter (e.g., resource ID) of the first schedule request with a specific parameter (e.g., resource ID) of the second schedule request. If the two parameters are identical to each other, the overlap section between the first TA (indicating TA of the measurement or report of the first schedule request) and the second TA (indicating TA of the measurement or report of the second schedule request).

In this case, the report or measurement action within the first TA may be performed in any part of the overlap section between the first TA and the second TA. Generally, there is a high possibility that the measurement or report action occurs in some initial sections from among the overlap sections of the first TA and the second TA, because the second schedule request is received later than the first schedule request. In this case, the M2M device may not separately perform the measurement or report within the overlap section corresponding to the second schedule request, and may use the report or measurement action within the overlap section in response to the first schedule request. That is, the measurement or report corresponding to the second schedule request belonging to the overlap section may be replaced with that of the first schedule request belonging to the overlap section.

Figure 8:
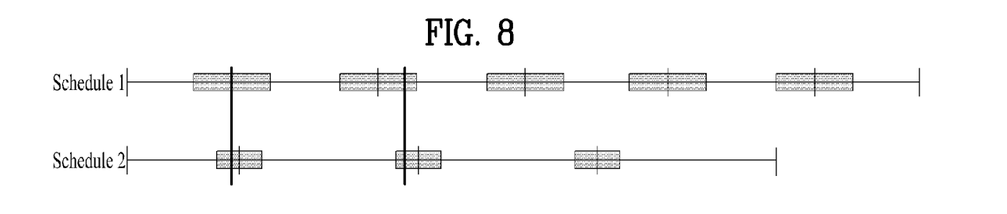
FIG. 8 is a conceptual diagram illustrating data of a schedule according to an embodiment of the present invention.

Exemplary operations of the above embodiments are shown in FIG. 8. The M2M device confirms a first schedule (Schedule 1) and a second schedule (Schedule 2), and detects the overlap section between TA1 and TA2. That is, the M2M device may detect the overlap section denoted by two vertical lines of FIG. 8, and may generate/store not only schedule data including associated information (i.e., wake-up time of the M2M device), but also schedule ID(s) of the corresponding schedule request. Thereafter, the above measurement or report action can be performed during a minimum wake-up time according to the schedule data.

Figure 9:
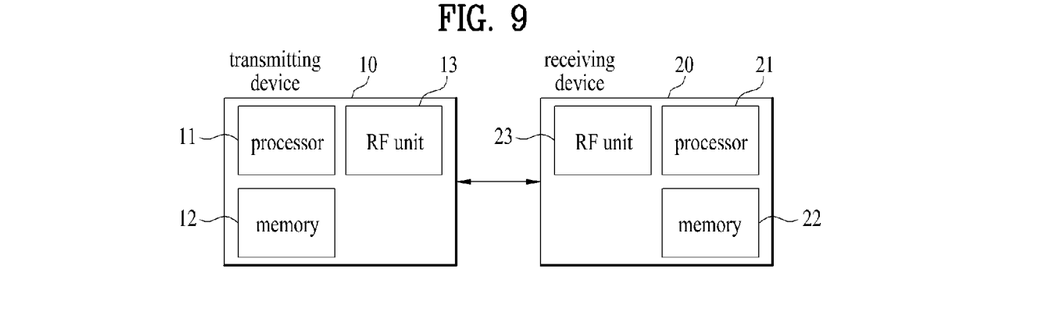
FIG. 9 is a block diagram illustrating a device according to embodiment(s) of the present invention.

FIG. 11 is a block diagram illustrating a device according to embodiment(s) of the present invention. Referring to FIG. 11, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In the embodiments of the present invention, M2M application, M2M server, or M2M device may serve as the transmission device 10 or the reception device 20.

The specific configurations of M2M application, M2M server or M2M device, serving as the reception device or the transmission device may be implemented such that the various embodiments of the present invention are performed independently or two or more embodiments of the present invention are performed simultaneously.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be used for UE, eNB, server, or other devices of the wireless communication system.

The invention claimed is:

1. A method for combining two or more schedules in a machine to machine (M2M) communication system by an M2M server, comprising:
   receiving at least one schedule request from at least one M2M application,
   wherein the schedule request is configured to request measurement or report of a specific resource for a specific M2M device;
   if an M2M device identifier (ID) and resource ID contained in the schedule request are identical to those of a pre-stored M2M schedule, determining whether a first allowable interval for measurement or report contained in the schedule request overlaps with a second allowable interval for measurement or report of the prestored M2M schedule; and if it is determined that the first allowable interval overlaps with the second allowable interval, generating mapping information indicating the relationship between the schedule request and the prestored M2M schedule.

2. The method according to claim 1, further comprising:
receiving a report for measurement from the M2M device in a overlap interval in which the first allowable interval overlaps with the second allowable interval.

3. The method according to claim 1, further comprising:
when receiving a report for first measurement of the prestored M2M schedule at a specific time of an overlap interval in which the first allowable interval overlaps with the second allowable interval, a report for measurement of the schedule request at the specific time is replaced with the received report for the first measurement.

4. The method according to claim 1, wherein the mapping information includes an identifier (ID) of the schedule request, an ID of the prestored M2M schedule, and condition for a report to the M2M application.

5. The method according to claim 1, wherein the schedule request includes at least one of a schedule ID, an M2M application ID, an M2M device ID, a resource ID, period of the measurement or report-related information, and allowable interval for the measurement or report-related information.

6. The method according to claim 5, wherein:
if the schedule ID is not contained in the schedule request, a schedule ID is allocated to the schedule request.

7. The method according to claim 1, further comprising:
if the first allowable interval does not overlap with the second allowable interval, generating and storing an M2M schedule corresponding to the schedule request.

8. The method according to claim 7, further comprising:
storing mapping information indicating the relationship between the generated M2M schedule and the schedule request.

9. The method according to claim 7, wherein the generated M2M schedule is transmitted to an M2M device indicated by a requested M2M device ID contained in the schedule request.

10. A method for combining two or more schedules in a machine to machine (M2M) communication system by an M2M device, comprising:

receiving, from at least one M2M server, at least two schedule requests transmitted from at least one M2M application, wherein each of the at least two schedule requests is configured to request measurement or report of a specific resource for a specific M2M device;

if an M2M device identifier (ID) and resource ID contained in a first schedule request are identical to those of a second schedule request, detecting an overlap interval in which a first allowable interval for measurement or report contained in the first schedule request overlaps with a second allowable interval for measurement or report contained in the second schedule request; and generating information regarding the overlap interval, and schedule data including a schedule ID contained in the first schedule request and a schedule ID contained in the second schedule request.

11. The method according to claim 10, further comprising:
performing the measurement or report in the overlap interval according to the generated schedule data.

12. The method according to claim 11, further comprising:
when receiving the first schedule request and the second schedule request from the same M2M server, transmitting a report for the generated schedule data to the M2M server via a single message.

13. The method according to claim 11, further comprising:
if a first measurement or first report related to the first schedule request is performed at a specific time of the overlap interval, a measurement or report of the second schedule request at the specific time is replaced with the first measurement or first report.

14. The method according to claim 10, wherein the schedule request includes at least one of a schedule ID, an M2M application ID, an M2M device ID, a resource ID, period of the measurement or report-related information, and allowable interval for the measurement or report-related information.

15. The method according to claim 14, wherein:
if the schedule ID is not contained in the schedule request, a schedule ID is allocated to the schedule request.

16. The method according to claim 10, further comprising:
if the first allowable interval does not overlap with the second allowable interval, performing the measurement or report according to first schedule data and second schedule data respectively corresponding to the first schedule request and the second schedule request.

* * * * *